(12) United States Patent
Lewis et al.

(10) Patent No.: US 11,687,872 B2
(45) Date of Patent: Jun. 27, 2023

(54) SYSTEM AND METHOD FOR REMOTE CONTROLLING OF ELECTRONIC SHELF LABELS

(71) Applicant: Walmart Apollo, LLC, Bentonville, AR (US)

(72) Inventors: Steven Lewis, Bentonville, AR (US); Matthew Biermann, Fayetteville, AR (US); Nicholaus A. Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 405 days.

(21) Appl. No.: 15/925,362

(22) Filed: Mar. 19, 2018

(65) Prior Publication Data
US 2018/0276603 A1    Sep. 27, 2018

Related U.S. Application Data

(60) Provisional application No. 62/475,292, filed on Mar. 23, 2017.

(51) Int. Cl.
*G06Q 10/08* (2023.01)
*G09F 3/20* (2006.01)
(Continued)

(52) U.S. Cl.
CPC ....... *G06Q 10/087* (2013.01); *G06K 17/0022* (2013.01); *G06K 19/07707* (2013.01); *G09F 3/208* (2013.01)

(58) Field of Classification Search
CPC ...... G06Q 10/087; G06Q 10/08; G06Q 30/06; G06K 17/0022; G06K 17/00;
(Continued)

(56) References Cited

U.S. PATENT DOCUMENTS

| | | | | |
|---|---|---|---|---|
| 4,766,295 | A | * | 8/1988 | Davis ...................... G06F 3/147 340/5.91 |
| 5,572,653 | A | * | 11/1996 | DeTemple ......... G06K 17/0022 235/383 |

(Continued)

OTHER PUBLICATIONS

Thomson, R. (2013). Analysis: Is dynamic pricing about to take off in retail? Retail Week, , n/a. Retrieved from https://dialog.proquest.com/professional/docview/1449185606?accountid=131444 (Year: 2013).*

(Continued)

*Primary Examiner* — Michael P Harrington
(74) *Attorney, Agent, or Firm* — Morgan, Lewis & Bockius LLP; Manita Rawat

(57) ABSTRACT

Systems, methods, and processor-readable storage media for remote controlling of electronic shelf labels. An example method includes receiving, at a computing device, store layout data of a retail store and product data. The product data identifies at least one product and a price of the product. The method causes an optical emitter to emit an optical signal to at least one electronic shelf label based at least in part on the store layout data, the product data, and a predetermined rule. The optical signal bears the product data and is configured to cause the electronic shelf label to change displayable information to reflect new product data. The electronic shelf label can also send feedback to the optical emitter to inform that the optical signal was successfully received.

18 Claims, 4 Drawing Sheets

(51) Int. Cl.
*G06Q 10/087* (2023.01)
*G06K 19/077* (2006.01)
*G06K 17/00* (2006.01)

(58) Field of Classification Search
CPC ............ G06K 17/0029; G06K 17/0025; G09F 3/208; G09F 3/204; G09F 9/372
See application file for complete search history.

(56) References Cited

U.S. PATENT DOCUMENTS

| | | | |
|---|---|---|---|
| 5,707,139 A | 1/1998 | Haitz | |
| 6,419,154 B1 | 7/2002 | Dalton et al. | |
| 6,715,676 B1* | 4/2004 | Janning | G06Q 30/06 235/383 |
| 6,753,830 B2 | 6/2004 | Gelbman | |
| 8,473,341 B1* | 6/2013 | Walker | G06Q 30/0207 705/14.34 |
| 2004/0037567 A1 | 2/2004 | Tjerneld et al. | |
| 2006/0163349 A1* | 7/2006 | Neugebauer | G06Q 30/02 235/383 |
| 2009/0295592 A1* | 12/2009 | Mizukawa | G07G 1/145 340/691.5 |
| 2011/0025461 A1* | 2/2011 | Nobutsugu | G06Q 10/087 340/5.92 |
| 2014/0310129 A1* | 10/2014 | Martin | G06F 3/147 705/26.61 |
| 2015/0186903 A1* | 7/2015 | Takahashi | G01S 7/497 356/5.1 |
| 2015/0198484 A1 | 7/2015 | Nilsson | |

OTHER PUBLICATIONS

"Electronic Shelf Labels"; http://www.pricer.com/en/Solutions/Electronic-Shelf-Labels/Electronic-Shelf-Label-System/Infrastructure/; accessed Jan. 10, 2017 (2 pages).
"Samsung Electro-Mechanics Introduces "Dynamic Pricing" Electronic Label"; http://samsungvillage.com/blog/2014/02/20/samsungblog-samsung-electro-mechanics-introduces-dynamic-pricing-electronic-label/; accessed Jan. 10, 2017 (5 pp).

* cited by examiner

SYSTEM AND METHOD FOR REMOTE CONTROLLING OF ELECTRONIC SHELF LABELS

BACKGROUND

1. Technical Field

The present disclosure relates to electronic shelf labels and, more specifically, to a system and a method for remote controlling of electronic shelf labels.

2. Introduction

Price labels are conventionally used in retail stores to inform customers about a price and product information of merchandise available for purchase. Price labels shall be up-to-date and accurately display price and other information. Thus, retail store personnel should monitor changes in prices and product description to update price labels accordingly. Updating or replacing price labels can be a non-trivial, highly manual, and time-consuming task, especially for large retail stores selling thousands of products. This task can be even more complicated when prices change a few times per day. Accordingly, there is a need to improve the field of price labels.

SUMMARY

Disclosed herein are systems, methods, and computer-readable storage mediums for remote controlling of electronic shelf labels, which overcome at least some drawbacks known in the art. An exemplary method for remote controlling of electronic shelf labels can include: receiving, at a computing device, store layout data of a retail store; receiving, at the computing device, product data of the retail store, wherein the product data identifies at least one product and a price of the at least one product; causing, at the computing device, an optical emitter to emit an optical signal based at least in part on the store layout data, the product data, and a predetermined rule, wherein the optical signal bears at least a part of the product data and is configured to change displayable information of at least one of the electronic shelf labels located at the retail store; and obtaining, at the computing device, a feedback from at least one of the electronic shelf labels.

An exemplary system for remote controlling of electronic shelf labels can include a processor and a computer-readable storage medium having instructions stored which, when executed by the processor, cause the processor to perform operations comprising: receiving store layout data of a retail store; receiving product data of the retail store, wherein the product data identifies at least one product and a price of the at least one product; causing an optical emitter to emit an optical signal based at least in part on the store layout data, the product data, and a predetermined rule, wherein the optical signal bears at least a part of the product data and is configured to change displayable information of at least one of the electronic shelf labels located at the retail store; and obtaining a feedback from at least one of the electronic shelf labels.

An exemplary non-transitory processor-readable storage medium can have instructions stored thereon, which when executed by one or more processors, cause the one or more processors to implement a method for remote controlling of electronic shelf labels, the method comprising: receiving, at a computing device, store layout data of a retail store; receiving, at the computing device, product data of the retail store, wherein the product data identifies at least one product and a price of the at least one product; causing, at the computing device, an optical emitter to emit an optical signal based at least in part on the store layout data, the product data, and a predetermined rule, wherein the optical signal bears at least a part of the product data and is configured to change displayable information of at least one of the electronic shelf labels located at the retail store; and obtaining, at the computing device, a feedback from at least one of the electronic shelf labels.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limitation in the figures of the accompanying drawings, in which like references indicate similar elements and in which.

DETAILED DESCRIPTION

Figure 1:
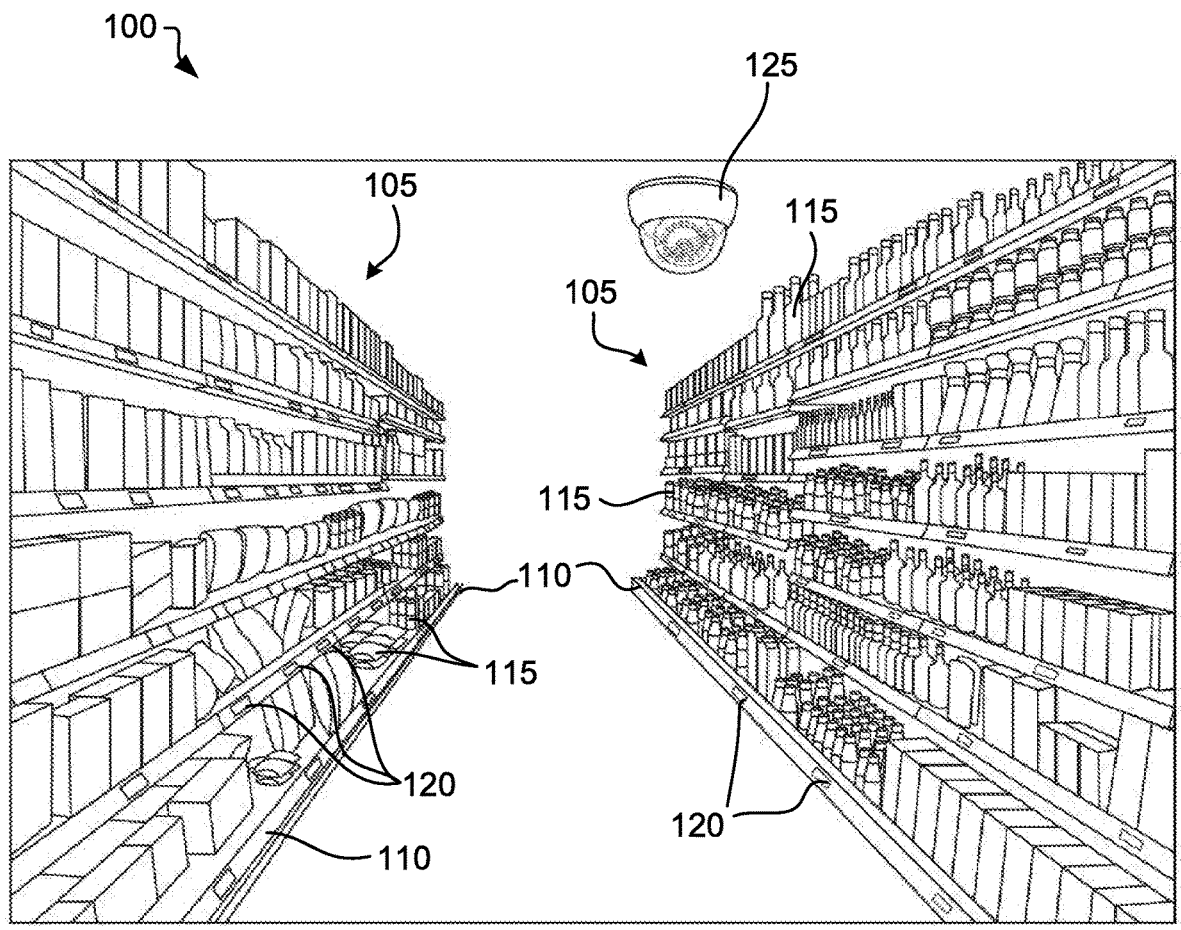
FIG. 1 illustrates premises of an example retail store suitable for practicing a system and a method for remote controlling of electronic shelf labels.

Various configurations and embodiments of the disclosure are described in detail below. While specific implementations are described, it should be understood that this is done for illustration purposes only. Other components and configurations may be used without parting from the spirit and scope of the disclosure.

The concepts and embodiments described herein are designed to automate and improve a process for updating information displayed by price labels. In this technology, the price labels include electronic shelf labels (ESL), which are configured to electronically display information such as a product price, product name, product description, and product-related promotional information. Each electronic shelf label may be an autonomous device suitable for attaching or fixing to products or shelfs in retail stores to inform customers about relevant product information and current price. The electronic shelf labels can receive data from and optionally transmit data to a central controller, which is configured to maintain current product information, store layout, and pricing data. The central controller is further configured to cause updating the electronic shelf labels such that they display renewed product information. The central controller can automatically and frequently update the information displayable by the electronic shelf labels in one or more retail stores. For example, the central controller can remotely cause electronic shelf labels associated with a certain product to update displayable information when the central controller determines that a price of the product is changed. Such an update can be performed as frequently as needed, for example, several times per day. Moreover, the central controller can update electronic shelf labels simultaneously in a plurality of retail stores.

According to the embodiments of this disclosure, the central controller is operatively connected to a plurality of electronic shelf labels through one or more optical emitters. The optical emitters are deployed on premises of retail stores such that they are in optical communication with one or more electronic shelf labels. When a price or description information of a certain product is to be changed, the central controller selects those electronic shelf labels which are associated with the product in one or more retail stores. The central controller determines what optical emitters can be in optical communication with the selected electronic shelf labels and causes these optical emitters to establish an optical one-way or two-way communication link to convey product data. Once received, the electronic shelf labels start displaying the product data or a portion thereof. The electronic shelf labels can also send a feedback signal to the optical emitters to inform, for example, that the product data was safely received. In some embodiments, the optical communication link between the optical emitters and electronic shelf labels can be encrypted to ensure that the product data or other information is securely transmitted. In addition, those skilled in the art would appreciate that the use of optical communication link does not require the electronic shelf labels to be wired and does not cause high power consumption by the electronic shelf labels.

The labels and prices may be changed in a dynamic fashion. For example, for a customer using "scan and go" it may be known what items a customer has in their cart. The price for other items the customer purchases may be varied based on what items are already in the cart, e.g. if a customer has tuna fish, they may be offered a different price for mayonnaise. Prices may also be varied in a dynamic manner based on the supply of the product, low supply+high demand=change in price.

For purposes of this disclosure, the terms "price label" and "electronic shelf label" can be used interchangeably and shall be construed to mean an electronic device with a display to display product-related information, including a product price, product description, and/or promotional message. The electronic shelf label is also configured to receive an optical signal and display information conveyed by the optical signal. The electronic shelf label can be attached or fixed on products, shelf edges, peg hooks, bins, hangers, or other places in a retail store.

The term "retail store" shall be construed to mean a store in which any variety of products may be purchased. Some examples of retail stores include, but not limited to, a brick-and-mortar store, supermarket, superstore, shopping mall, shopping plaza, grocery store, convenience market, one-stop shopping store, clothing store, service store, vending machine, kiosk, and the like. The term "product" shall be construed to mean a consumer good or service that can be sold and purchased in a retail store. The terms "product data" shall be construed to mean digital data conveying information associated with one or more products. For example, product data can include a price of a product, a product name, product description, product advertisement, product-related promotional information, and the like. The term "optical emitter" shall be construed to mean an electronic device configured to transmit an optical signal to one or more electronic shelf labels. In some embodiments, the optical emitter can be also configured to receive an optical signal from one or more electronic shelf labels.

Example embodiments and specific implementations are described below in detail as illustrations of the disclosure. While these embodiments and implementations are described, it should be understood that this is done for illustration purposes only. Other components and configurations may be used without parting from the spirit and scope of the disclosure. In addition, components, steps, and features described may be removed, added, or combined from the provided examples.

FIG. 1 illustrates premises of an example retail store 100 where a system and a method for remote controlling of electronic shelf labels can be employed. Particularly, FIG. 1 shows an aisle in retail store 100 with two shelving units 105. Each shelving unit 105 includes a plurality of shelves 110 or other fixtures for arranging products 115 such as consumer goods. Products are associated with electronic shelf labels 120, which can be attached to shelves 120 or products 115. Electronic shelf labels 120 can be associated with certain coordinates designating their location at shelving units 105 or retail store 100. For example, each electronic shelf label 120 can be assigned with a certain planogram location or planogram coordinates.

Further, each electronic shelf label 120 includes a display for displaying product data associated with a certain product 115. FIG. 1 further shows an optical emitter 125 which can be arranged above shelving units 105. For example, optical emitter 125 can be secured to a ceiling, walls or any other construction element of retail store 100. Optical emitter 125 can be configured to establish an optical one-way or two-way communication link with one or more of electronic shelf labels 120. In certain embodiments, optical emitter 125 sends data to or exchanges data with one electronic shelf label 120 selected from a plurality of electronic shelf labels 120. The data can be sent using pulsed or modulated light signals within a visible or non-visible spectrum ranges. Thus, optical emitter 125 causes electronic shelf labels 120 arranged on shelving units 105 to update displayable product data by transmitting the optical signals.

Figure 2:
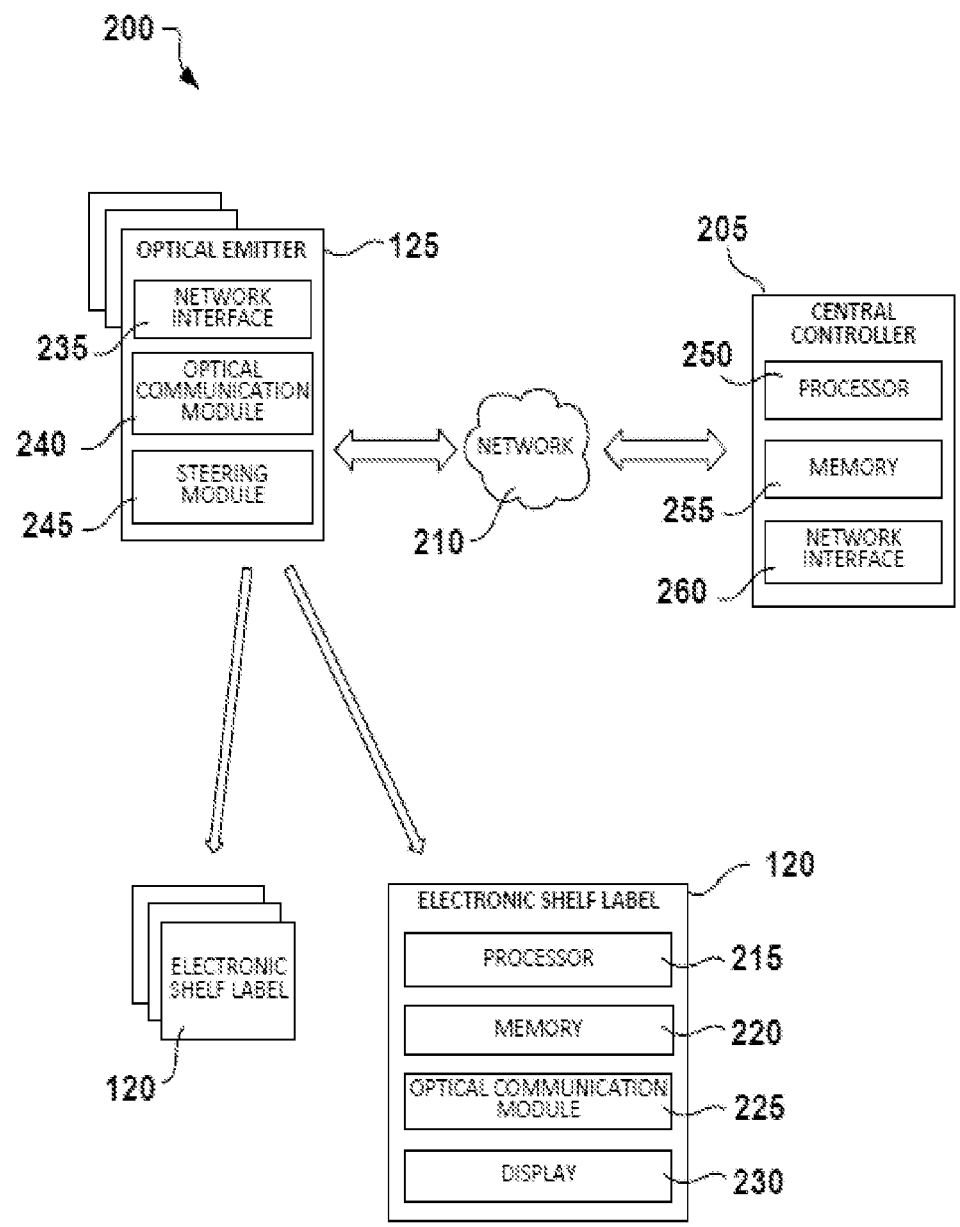
FIG. 2 illustrates an example system architecture for practicing the methods for remote controlling of electronic shelf labels according to one embodiment.

FIG. 2 illustrates an example system architecture 200 for practicing the methods for remote controlling of electronic shelf labels 120. As shown in this drawing, system architecture 200 includes a central controller 205 which is directly or indirectly connected to one or more optical emitters 125. Central controller 205 can be coupled to optical emitters 125 via communications network 210. Communications network 210 can refer to any wired, wireless, or optical network. Each optical emitter 125 can be in direct communication with one or more electronic shelf labels 120 via an optical communication link.

According to one example implementation, each electronic shelf label 120 includes a processor 215 configured to perform data processing, including processing of product data or optical signals. Further, electronic shelf label 120 includes a memory 220 for storing product data and processor-executable codes enabling electronic shelf label 120 to operate according to the methods of this disclosure. Electronic shelf label 120 also includes an optical communication module 225 configured to receive optical signals from optical emitter 125. Optical communication module 225 can include a photodetector, photodiode, an optical receiver, and the like. In certain implementations, however, optical communication module 225 can be also configured to transmit certain optical signals, such as feedback signals, back to optical emitter 125. In these implementations, optical communication module 225 may also include an optical transmitting device such as a laser, light-emitting diode (LED), and the like.

Electronic shelf label 120 also includes a display 230 such as a Liquid Crystal Display (LCD) or electronic ink (e-ink) display. Display 230 is designed to display at least a part of product data received through the optical signal from optical emitter 125. Display 230 displays a renewed or updated product data as soon as it is received from optical emitter 125.

Although not shown in FIG. 2, electronic shelf label 120 can also embed one or more additional modules, including, for example, a battery, power supply module, communication bus, an input module, an output module, antenna, a radio module, housing, and so forth.

As illustrated in FIG. 2, optical emitter 125 includes a network interface 235 configured to obtain product data and certain instructions from central controller 205. Network interface can include, for example, Ethernet-type device or modem. Further, optical emitter 125 includes an optical communication module 240 configured to generate and transmit optical signals to one or more electronic shelf labels 120. The optical signals transmitted between optical emitter 125 and electronic shelf labels 120 can include electromagnetic radiation of visible spectrum, infrared (IR) spectrum, or ultraviolet (UV) spectrum. In other words, the optical signals can have a wavelength selected in a range from about 10 nanometers to about 0.1 centimeter. The optical signals can be also modulated, coded, and encrypted, depending on an implementation. Accordingly, optical communication module 240 can include an optical transmitting device such as a laser, light-emitting diode (LED), and the like. In certain implementations, however, optical communication module 240 can be also configured to receive certain optical signals, such as the feedback signals, from electronic shelf labels 120. In these implementations, optical communication module 240 may also include a photodetector, photodiode, or optical receiver.

Optical emitter 125 further includes a steering module 245 configured to rotate, tilt, steer, orient, or position either the entire optical emitter 125 or optical communication module 240 of optical emitter 125. For example, steering module 245 can include one or more servomotors or actuators to cause either optical emitter 125 or optical communication module 240 to rotate, tilt, or steer in order to direct an optical signal generated by optical communication module 240 towards one or more selected electronic shelf labels 120. Thus, optical emitter 125 is designed to establish an optical communication link with certain selected electronic shelf labels 120 within retail store 100 such that separate product data packets (signals) can be individually sent to only those electronic shelf labels 120 which are placed near products 115 related to the product data packets. Steering module 245 can be also configured to cause optical emitter 125 or optical communication module 240 to rotate, tilt, or steer in order to direct the optical signal towards one selected electronic shelf label 120 excluding other electronic shelf labels 120.

Still referencing to FIG. 2, central controller 205 includes a processor 250 for processing product data and executing certain steps of the methods disclosed herein. Central controller 205 further includes a memory 255 for storing product data and store layout data such as a planogram. Memory 255 can also include processor-executable codes, which when executed by processor 250, cause central controller 205 to perform certain steps of the methods for controlling electronic shelf labels 120. Central controller 205 can also include a network interface 260 configured to transmit product data and certain instructions to one or more optical emitters 125. Network interface 260 can include, for example, Ethernet-type device or modem. Overall, central controller 205 can be implemented as a computer device such as a personal computer, server, network device, or workstation.

Central controller 205 can be deployed inside or outside of retail store premises. For example, central controller 205 can be a server located remotely to retail store 100 and it can be configured to enable users, such as product managers, to remotely control, manage, or otherwise supervise electronic shelf labels 120, planograms, and the like. For these ends, central controller 205 can perform a web service or provide an online platform, such as one available via a website, which the users can access to and program electronic shelf labels 120.

Figure 3:
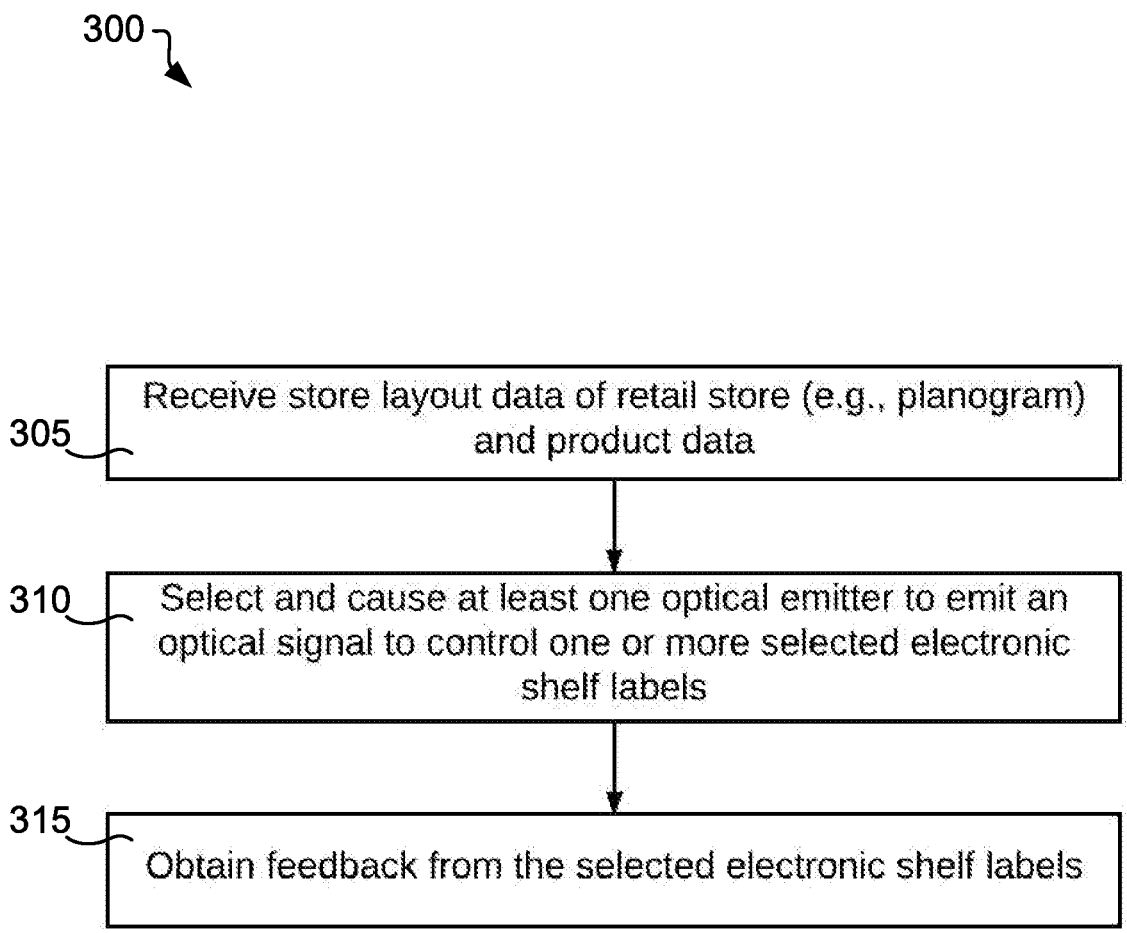
FIG. 3 illustrates a process flow diagram showing an example method for remote controlling of electronic shelf labels according to one embodiment.

FIG. 3 illustrates a process flow diagram showing an example method 300 for remote controlling of electronic shelf labels 120 according to one embodiment. Method 300 may be performed by processing logic that may comprise hardware (e.g., decision-making logic, dedicated logic, programmable logic, application-specific integrated circuit, and microcode), software (such as software run on a general-purpose computer system or a dedicated machine), or a combination of both. In one example embodiment, the processing logic refers to central controller 205 as described above. Below recited operations of method 300 may be implemented in an order different than described and shown in the figure. Moreover, method 300 may have additional operations not shown herein, but which can be evident for those skilled in the art from the present disclosure. Method 300 may also have fewer operations than outlined below and shown in FIG. 3.

Method 300 commences at operation 305 with central controller 205 receiving store layout data of retail store 100 and product data associated with retail store 100. The store layout data provides information concerning placement or location of products on premises of one or more retail stores 100. For example, the store layout data includes one or more planograms. The term "planogram" shall be construed to mean a visual representation of placement, organization, layout, or location of products within a retail store. A planogram can be a two-dimensional or three-dimensional diagram or model showing the placement of products on a fixture. Thus, a planogram describes or is associated with one or more shelving units 105 and/or one or more shelves 110. The product data associated with retail store 100 includes at least pricing information of at least one product arranged or to be arranged in retail store 100 according to the store layout data or planogram. The product data can also include a product name, product description, and promotional information. Hence, the product data is associated with the store layout data. In some implementations, the product data can include a new or updated price of one or more certain products.

At operation 310, central controller 205 selects at least one optical emitter 125 based at least in part on the store layout data, the product data, and a predetermined rule. Further, central controller 205 causes the selected optical emitter 125 to generate and emit at least one optical signal towards at least one selected electronic shelf label 120 based at least in part on the store layout data, the product data, and the predetermined rule. For these ends, central controller 205 can transmit the product data and instructions to the selected optical emitter 125, where the instructions are based on the store layout data or planogram. The instructions direct the selected optical emitter 125 to generate and send the optical signal to selected electronic shelf labels 120. The instructions can further cause steering module 245 to steer, rotate, tilt, orient, or position the selected optical emitter 125 or optical communication module 240 of selected optical emitter 125 such that the optical signal is sent directly from selected optical emitter 125 to selected electronic shelf label 120 excluding other non-selected electronic shelf labels 120.

The optical signal can be generated and sent to selected electronic shelf label 120 on a regular (periodic) or non-regular basis. For example, the optical signal is sent to selected electronic shelf label 120 in response to central controller 205 obtaining a new price of a certain product 115. In another example, the optical signal is sent to selected electronic shelf label 120 based on a predetermined time schedule (e.g., hourly, twice a day, daily, weekly, etc.).

When the optical signal is received by electronic shelf label 120, the optical signal can be translated, decrypted, interpreted, or otherwise processed to retrieve the product data. Further, electronic shelf label 120 displays at least a portion of the product data retrieved from the optical signal. For example, electronic shelf label 120 displays a new price of the product.

In certain embodiments, electronic shelf label 120 can generate and send a feedback to optical emitter 125. The feedback is designed to inform optical emitter 125 that the optical signal has been successfully received. In addition, the feedback may indicate successful change of displayable information by at least one of electronic shelf labels 120. The feedback can be sent as a second optical signal, but not necessarily. Optical emitter 125 can transform the second optical signal received from electronic shelf label 120 into an electronic signal or digital data, and send the same to central controller 205. Accordingly, at operation 315, central controller 205 obtains the feedback or its derivative from at least one electronic shelf label 120 and through optical emitter 125. In other words, central controller 205 obtains feedback data from a plurality of electronic shelf labels 120.

Figure 4:
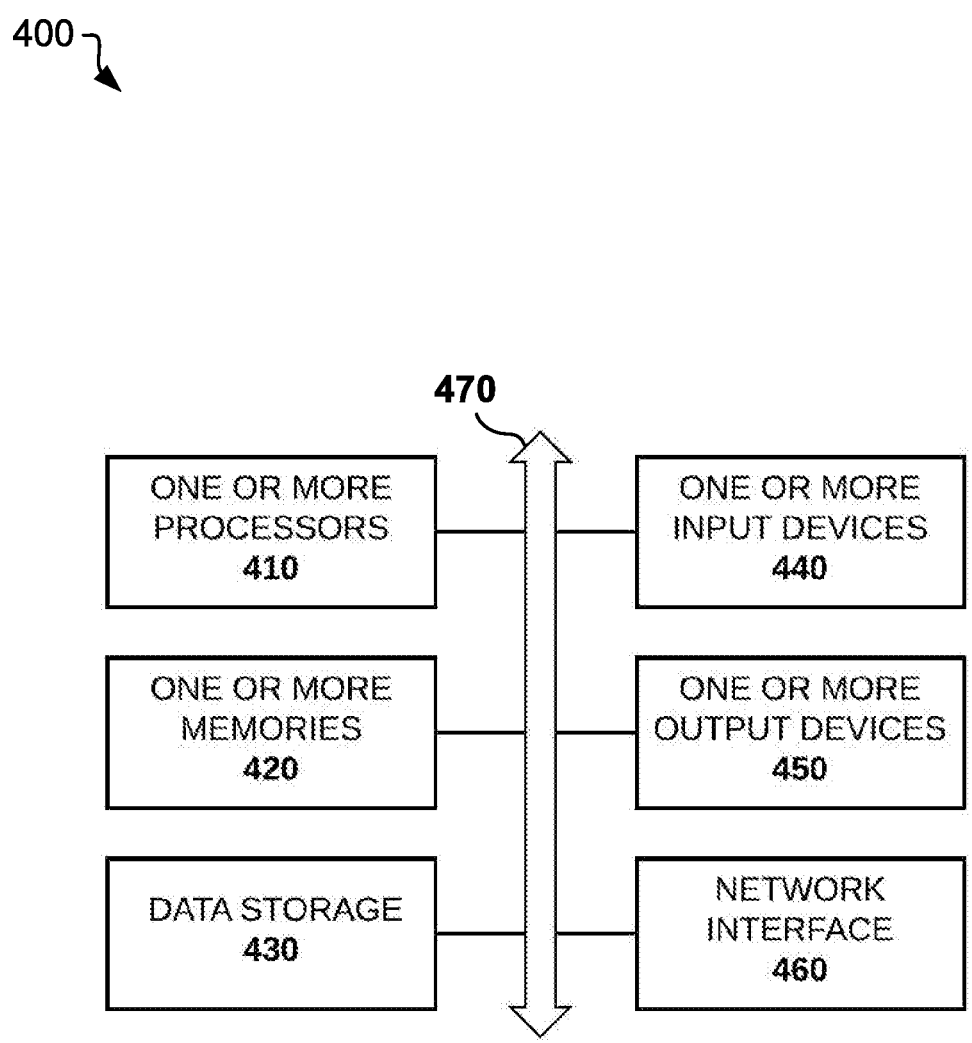
FIG. 4 illustrates an example computer system which can be used to perform the method for remote controlling of electronic shelf labels according to one embodiment.

FIG. 4 illustrates an example computer system 400 which can be used to perform the method processing merchandise shipping as disclosed herein. Computer system 400 can be an instance of at least one of central controller 205 and optical emitter 125. Computing system 400 includes one or more processors 410, one or more memories 420, one or more data storages 430, one or more input devices 440, one or more output devices 450, network interface 460, one or more optional peripheral devices, and a communication bus 470 for operatively interconnecting the above-listed elements. Processors 410 can be configured to implement functionality and/or process instructions for execution within computing system 400. For example, processors 410 may process instructions stored in memory 420 or instructions stored on data storage 430. Such instructions may include components of an operating system or software applications.

Memory 420, according to one example, is configured to store information within computing system 400 during operation. For example, memory 420 can store instructions to perform the methods for processing merchandise shipping. Memory 420, in some example embodiments, may refer to a non-transitory computer-readable storage medium or a computer-readable storage device. In some examples, memory 420 is a temporary memory, meaning that a primary purpose of memory 420 may not be long-term storage. Memory 420 may also refer to a volatile memory, meaning that memory 420 does not maintain stored contents when memory 420 is not receiving power. Examples of volatile memories include RAM, dynamic random access memories (DRAM), static random access memories (SRAM), and other forms of volatile memories known in the art. In some examples, memory 420 is used to store program instructions for execution by processors 410. Memory 420, in one example, is used by software applications or mobile applications. Generally, software or mobile applications refer to software applications suitable for implementing at least some operations of the methods as described herein.

Data storage 430 can also include one or more transitory or non-transitory computer-readable storage media or computer-readable storage devices. For example, data storage 430 can store instructions for processor 410 to implement the methods described herein. In some embodiments, data storage 430 may be configured to store greater amounts of information than memory 420. Data storage 430 may be also configured for long-term storage of information. In some examples, data storage 430 includes non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing system 400 may also include one or more input devices 440. Input devices 440 may be configured to receive input from a user through tactile, audio, video, or biometric channels. Examples of input devices 440 may include a keyboard, keypad, mouse, trackball, touchscreen, touchpad, microphone, video camera, image sensor, fingerprint sensor, or any other device capable of detecting an input from a user or other source, and relaying the input to computing system 400 or components thereof.

Output devices 450 may be configured to provide output to a user through visual or auditory channels. Output devices 450 may include a video graphics adapter card, display, such as LCD monitor, LED monitor, or organic LED monitor, sound card, speaker, lighting device, projector, or any other device capable of generating output that may be intelligible to a user. Output devices 450 may also include a touchscreen, presence-sensitive display, or other input/output capable displays known in the art.

Computing system 400 can also include network interface 460. Network interface 460 can be utilized to communicate with external devices via one or more communications networks such as data network 120 or any other wired, wireless, or optical networks. Network interface 460 may be a network interface card, such as an Ethernet card, an optical transceiver, a radio frequency transceiver, or any other type of device that can send and receive information.

An operating system of computing system 400 may control one or more functionalities of computing system 400 or components thereof. For example, the operating system may interact with the software or mobile applications and may facilitate one or more interactions between the software/mobile applications and processors 410, memory 420, data storages 430, input devices 440, output devices 450, and network interface 460. The operating system may interact with or be otherwise coupled to software applications or components thereof. In some embodiments, software or mobile applications may be included in the operating system.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method for remote controlling of electronic shelf labels, the method comprising:
   receiving, at a computing device, product data of a retail store, wherein the product data identifies at least one product and a price of the at least one product;
   receiving, at the computing device, store layout data of the retail store, the store layout data including locations of shelves in the retail store, the at least one product arranged at respective locations of shelves, and coordinates of a plurality of electronic shelf labels disposed on the shelves;
   associating the product data with a corresponding location of the shelves where the at least one product is arranged;
   receiving, by the computing device, a list of products within a shopping cart of a shopper;
   modifying, by the computing device, one or more data elements of the product data associated with the price of the at least one product that reflects a change in the price of the at least one product based on at least a first product in the list of products within the shopping cart;
   based at least on the modified product data and the store layout data, retrieving, by the computing device, the location of the shelves where the at least one product is arranged and the coordinates for a first electronic shelf label of the plurality of electronic shelf labels disposed on the shelves that is associated with the at least one product;
   in response to the modification of the price of the at least one product, determining, by the computing device, at least a first optical emitter of a plurality of optical emitters is capable of communicating with the first electronic shelf label, based on the modified product data, the store layout data, the coordinates of the first electronic shelf label, and a predetermined rule;
   selecting the first optical emitter to communicate with the first electronic shelf label;
   transmitting, by the computing device and to the first optical emitter, an instruction including at least a part of the modified product data and the coordinates for the first electronic shelf label, the instruction causing:
      positioning of the first optical emitter to direct an optical signal emitted by the first optical emitter to the coordinates of the first electronic shelf label, wherein an optical link is established with only the first electronic shelf label; and
      emission of an optical signal, by the first optical emitter and to the first electronic shelf label where the optical signal is decrypted by the first electronic shelf label, the decrypted optical signal including at least the part of the modified product data including the changed price that causes a display, by the first electronic shelf label, of information associated with the at least the part of the modified product data and the changed price; and
   obtaining, by the computing device, a feedback from at least the first electronic shelf label.

2. The method of claim 1, wherein the feedback indicates a successful change of the displayable information by the first electronic shelf label.

3. The method of claim 1, wherein the first optical emitter is caused to emit the optical signal until the feedback is received from the first electronic shelf label.

4. The method of claim 1, wherein the first optical emitter is caused to emit the optical signal based on a predetermined time schedule.

5. The method of claim 1, wherein the store layout data further includes a planogram.

6. The method of claim 1, wherein the first optical emitter is arranged at a ceiling of the retail store.

7. The method of claim 1, wherein the first optical emitter is rotatable or steerable in order to direct the optical signal to a location of the first electronic shelf label.

8. The method of claim 1, wherein the product data further includes product description data.

9. A system for remote controlling of electronic shelf labels, the system comprising:
   a processor; and
   a computer-readable storage medium having instructions stored which, when executed by the processor, cause the processor to perform operations comprising:
      receiving, at a computing device, product data of a retail store, wherein the product data identifies at least one product and a price of the at least one product;
      receiving, at the computing device, store layout data of the retail store, the store layout data including locations of shelves in the retail store, the at least one product arranged at respective locations of shelves, and coordinates of a plurality of electronic shelf labels disposed on the shelves;
      associating the product data with a corresponding location of the shelves where the at least one product is arranged;
      receiving, at the computing device, a list of products within a shopping cart of a shopper;
      modifying, at the computing device, one or more data elements of the product data associated with the price of the at least one product that reflects a change in the price of the at least one product based on at least a first product in the list of products within the shopping cart;
      based at least on the modified product data and the store layout data, retrieving the location of the shelves where the at least one product is arranged and the coordinates for a first electronic shelf label of the plurality of electronic shelf labels disposed on the shelves that is associated with the at least one product;
      in response to the modification of the price of the at least one product, determining at least a first optical emitter of a plurality of optical emitters is capable of communicating with the first electronic shelf label, based on the modified product data, the store layout data, the coordinates of the first electronic shelf label, and a predetermined rule;
      selecting at least the first optical emitter to communicate with the first electronic shelf label;
      transmitting, to the first optical emitter, an instruction including at least a part of the modified product data and the coordinates for the first electronic shelf label, the instruction causing:
         positioning of the first optical emitter to direct an optical signal emitted by the first optical emitter to the coordinates of the first electronic shelf label, wherein an optical link is established with only the first electronic shelf label; and
         emission of an optical signal, by the first optical emitter and to the first electronic shelf label where the optical signal is decrypted by the first electronic shelf label, the decrypted optical signal including at least the part of the modified product data including the changed price that causes a display, by the first electronic shelf label, of information associated with the at least the part of the modified product data and the changed price; and obtaining, by the computing device, a feedback from the first electronic shelf label.

10. The system of claim 9 wherein each of the electronic shelf labels includes:
    a display configured to display at least the part of the modified product data;
    a processing module configured to process the optical signal to translate the optical signal into the displayable information; and
    an optical communication module, wherein the optical communication module is configured to optically communicate with the first optical emitter.

11. The system of claim 10, wherein the optical communication module between the optical communication module and the first optical emitter is based on at least one of the following: an ultraviolet (UV) light signals, infrared (IR) light signal, and a laser-generated light signals.

12. The system of claim 9, further comprising:
    the first optical emitter, wherein the first optical emitter is configured to be arranged at a ceiling of the retail store, and wherein the first optical emitter includes:
    at least one optical communication module for optically transmitting the optical signal to the first electronic shelf label and optically receiving the feedback from the first electronic shelf label; and
    a steering module configured to rotate or steer the at least one optical communication module in order to direct the optical signal to a location of the first electronic shelf label.

13. The system of claim 9, wherein the feedback indicates a successful change of the displayable information by the first electronic shelf label.

14. The system of claim 9, wherein the first optical emitter is caused to emit the optical signal until the feedback is received from the first electronic shelf label.

15. The system of claim 9, wherein the first optical emitter is caused to emit the optical signal based on a predetermined time schedule.

16. The system of claim 9, wherein the store layout data further includes a planogram.

17. The system of claim 9, wherein the product data further includes product description data.

18. A non-transitory processor-readable medium having instructions stored thereon, which when executed by one or more processors, cause the one or more processors to:

receive product data of a retail store, wherein the product data identifies at least one product and a price of the at least one product;

receive store layout data of the retail store, the store layout data including locations of shelves in the retail store, the at least one product arranged at respective locations of shelves, and coordinates of a plurality of electronic shelf labels disposed on the shelves;

associate the product data with a corresponding location of the shelves where the at least one product is arranged;

receive a list of products within a shopping cart of a shopper;

modify, one or more data elements of the product data associated with the price of the at least one product that reflects a change in the price of the at least one product based on at least a first product in the list of products within the shopping cart;

based at least on the modified product data and the store layout data, retrieve the location of the shelves where the at least one product is arranged and the coordinates for a first electronic shelf label of the plurality of electronic shelf labels disposed on the shelves that is associated with the at least one product in response to the modification of the price of the at least one product, determine at least a first optical emitter of a plurality of optical emitters is capable of communicating with the first electronic shelf label, based on the modified product data, the store layout data, the coordinates of the first electronic shelf label, and a predetermined rule;

select at least the first optical emitter to communicate with the first electronic shelf label;

transmit, to the first optical emitter, an instruction including at least a part of the modified product data and the coordinates for the first electronic shelf label, the instruction causing:

positioning of the first optical emitter to direct an optical signal emitted by the first optical emitter to the coordinates of the first electronic shelf label, wherein an optical link is established with only the first electronic shelf label; and emission of an optical signal, by the first optical emitter and to the first electronic shelf label where the optical signal is decrypted by the first electronic shelf label, the decrypted optical signal including the at least the part of the modified product data including the changed price that causes a display, by the first electronic shelf label, of information associated with the at least the part of the modified product data and the changed price; and obtain a feedback from the first electronic shelf label.

* * * * *